United States Patent [19]

Janczyk

[11] Patent Number: 5,757,780
[45] Date of Patent: May 26, 1998

[54] METHOD AND CIRCUIT ARRANGEMENT FOR MONITORING DECLARED TRANSMISSION BIT RATES IN THE TRANSMISSION OF MESSAGE CELLS

[75] Inventor: Georg-Raffael Janczyk, Augsburg, Germany

[73] Assignee: Siemens Aktiengesellschaft, Munich, Germany

[21] Appl. No.: 575,151

[22] Filed: Dec. 19, 1995

[30] Foreign Application Priority Data

Dec. 30, 1994 [DE] Germany .......................... 44 47 240.4

[51] Int. Cl.$^6$ .............................. H04L 12/26; H04J 3/14
[52] U.S. Cl. .................................................. 370/253
[58] Field of Search ............................. 370/253, 252, 370/232–234, 905, 395–399, 142; 375/225; 395/200.13

[56] References Cited

U.S. PATENT DOCUMENTS

| 5,117,417 | 5/1992 | Danner | 370/253 |
| 5,140,588 | 8/1992 | Danner | 370/253 |
| 5,276,676 | 1/1994 | Horn | 370/253 |
| 5,295,135 | 3/1994 | Kammerl | 370/253 |
| 5,339,332 | 8/1994 | Kammerl | 375/225 |
| 5,402,426 | 3/1995 | Foglar | 371/20.1 |

FOREIGN PATENT DOCUMENTS

| 2087120 | 7/1993 | Canada. |
| 0381275 B1 | 8/1990 | European Pat. Off.. |

Primary Examiner—Douglas W. Olms
Assistant Examiner—Matthew C. Phillips
Attorney, Agent, or Firm—Hill & Simpson

[57] ABSTRACT

For a call-associated bit rate monitoring, it is provided that a count value (d) corresponding to the relationship between the maximally allowed transmission bit rate and the transmission bit rate declared for the connection and a minimum counter reading ($W_{min}$) (or, respectively, a maximum counter reading ($W_{max}$)) are determined during the course of the setup of the respective connection. Over and above this, the plurality of message cells appearing during the course of established connections is acquired by a global counter that is incremented by a value "1" at every appearance of a message cell. In response to the appearance of a message cell, a sum value (or, respectively, difference value) is additionally individually formed for the respective connection from a momentary counter reading maintained for the respective connection and the global counter reading. The sum value (or, respectively, difference value) is thereby compared to the minimum counter reading (or, respectively, maximum counter reading) in order to be able to identify a transgression of the transmission bit rate declared for the respective connection.

8 Claims, 3 Drawing Sheets

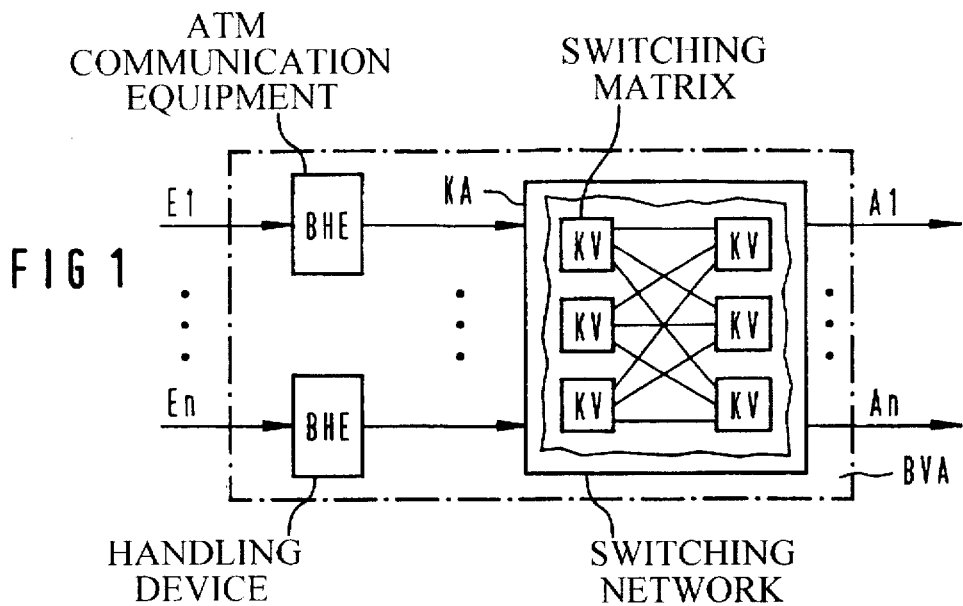
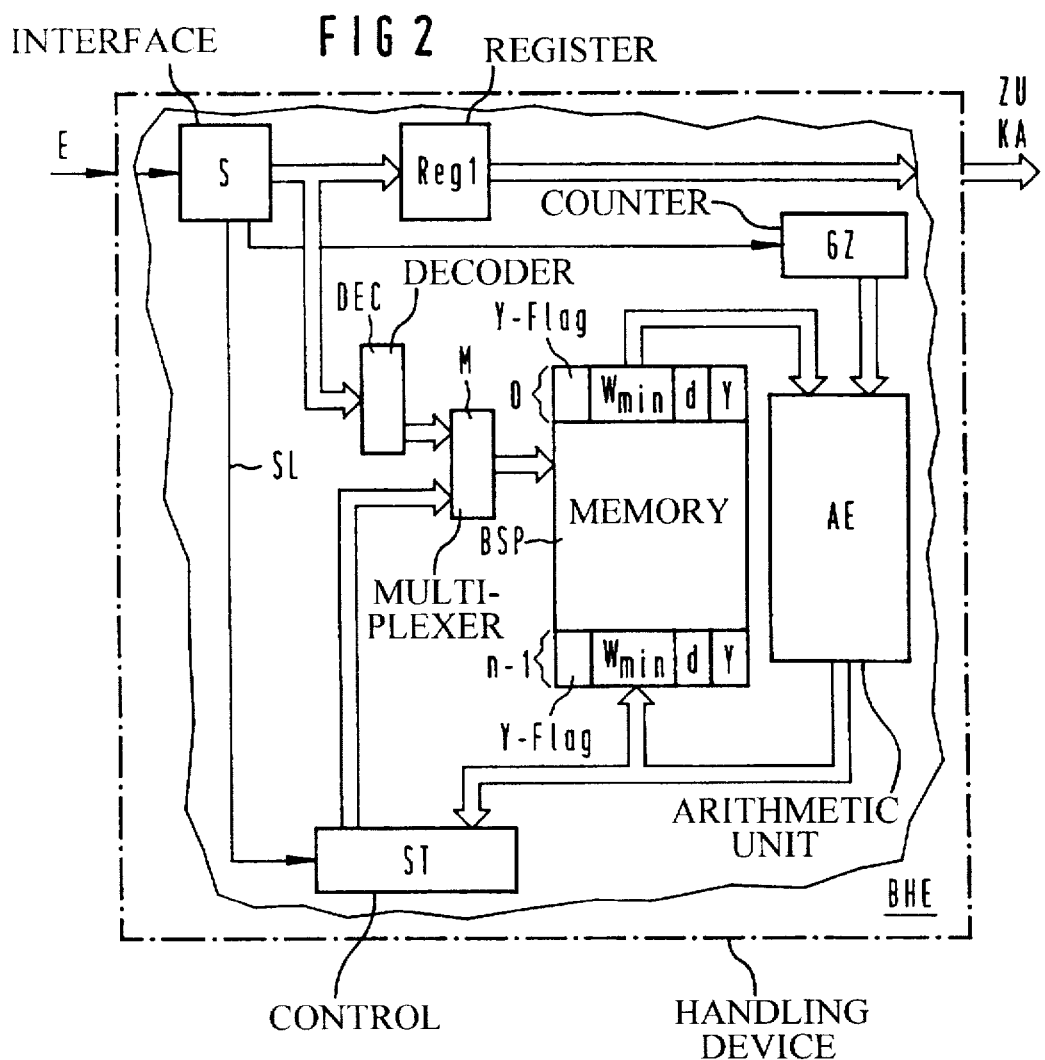

METHOD AND CIRCUIT ARRANGEMENT FOR MONITORING DECLARED TRANSMISSION BIT RATES IN THE TRANSMISSION OF MESSAGE CELLS

BACKGROUND OF THE INVENTION

The present invention is directed to a method and to a circuit arrangement.

Such a method and such a circuit arrangement are already disclosed by European reference EP-B1-0 381 275. Call-associated counters are maintained therein whose momentary counter reading, is incremented in proportion to the plurality of message cells arriving for the respective virtual connection and, is reduced in proportion to the time. It is thereby provided that the momentary counter reading of the counter allocated to a virtual connection is merely reduced, only upon arrival of a message cell of this virtual connection, by a value that is a function of the time interval between the time of arrival of this message cell and the time of the arrival of a preceding message cell of the same virtual connection.

Over and above this, Canadian Patent Application CA-2087120 already discloses a method and circuit arrangement for monitoring transmission bit rates. It is provided therein that, a theoretically maximum time interval between two successive message cells of one and the same virtual connection is determined for each virtual connection corresponding to the requested transmission bit rate. This theoretically maximum time interval is retained together with an imaginary time of transmission of the last message cells of the same virtual connection. Also a maximum delay time of a message cell within the system is stored. Upon arrival of a message cell, a time value is calculated of the current time of arrival of the appertaining message cell and the maximum delay time. This time value is compared to a further time value that is formed by addition of the retained time of transmission of the last message cell of the same virtual connection and the minimum time interval. The respective message cell is thereby only forwarded when the first time value is higher than the further time value.

It is required in both of these methods to implement a time determination with every occurrence of a message cell. This has to be potentially implemented with an extremely high precision dependence on the allowable tolerance for the bit rate monitoring. A time determination outlay is thus associated with a message cell that is undesirable, particularly in view of the high transmission bit rates within ATM switching networks.

SUMMARY OF THE INVENTION

It is an object of the present invention to provide a method and circuit arrangement that reduces the control outlay upon arrival of a message cell, particularly the control outlay with respect to the time acquisition.

In general terms the present invention is a method for monitoring declared transmission bit rates in the transmission of message cells according to an asynchronous transfer mode during the course of virtual connections. A counter means individually allocated to the individual virtual connections is used whose momentary counter reading is modified with every appearance of a message cell of the respective virtual connection that is referenced by a connection information contained in the respective message cell. A transgression of the declared transmission bit rate is indicated when the momentary counter reading reaches a predetermined minimum limit value. A count value corresponding to relationship between the maximally permitted transmission bit rate and the transmission bit rate declared for the virtual connection, and a minimum counter reading as a limit value are call-individually determined for the allocated counter means during the course of the setup of the respective virtual connection. The count value and minimum counter reading are retained for the duration of the existence of the virtual connection. The momentary counter reading is also set to a fixed, initial counter reading. The plurality of message cells appearing during the course of established virtual connection is acquired by a global counter reading that is incremented by a value "1" with every appearance of a message cell. A sum value is additionally individually formed for the respective virtual connection in response to the appearance of a message cell. The sum value is formed from the momentary counter reading and the current global counter reading. The sum value is compared to the minimum counter reading. Given a sum value that is greater than or equal minimum counter reading, the momentary counter reading is decremented by the count value retained for the respective virtual connection and is retained as a current momentary counter reading. Given a sum value that is less than the minimum counter reading, the momentary counter reading is retained and a transgression of the transmission bit rate declared for the respective virtual connection is indicated.

In an advantageous development of the present invention, given a positive sum value, the momentary counter reading is set to a negative value of the global counter reading. The momentary counter reading resulting therefrom is directly decremented by the count value retained for the respective virtual connection, that is, without a comparison of the sum value to the minimum counter reading, and is retained as current momentary counter reading.

In an alternative embodiment of the present invention the transgression of the declared transmission bit rate is indicated when the momentary counter reading reaches a predetermined maximum limit value.

A difference value is compared predetermined maximum counter reading. Given a difference value that is less than or equal to the maximum counter reading, the momentary counter reading is incremented by the count value retained for the respective virtual connection and is retained as a current momentary counter reading. Given a sum value that is greater than the maximum counter reading, the momentary counter reading is retained and a transgression of the transmission bit rate declared for the respective virtual connection is indicated.

In an advantageous development of the embodiment of the present invention for forming the difference value, the maximum counter reading is subtracted from the momentary counter reading. Given a negative difference value deriving therefrom, the momentary counter reading is set to the value of the global counter reading. The momentary counter reading resulting therefrom is directly incremented by the count value retained for the respective virtual connection, that is, without a comparison of the sum value to the maximum counter reading, and is retained as current momentary counter reading.

In a further advantageous development of the first method of the present invention the global counter reading is respectively acquired by a plurality of count bits in successive count cycles. In addition to the count bits, an overflow bit is maintained whose logical level is inverted with every beginning of a count cycle and a comparison bit is maintained for each of the virtual connection. The counter reading of the respective virtual connection is updated at least once per count cycle in that, given inequality of the logical level of the comparison bit allocated to the respective virtual connection and the overflow bit, the momentary counter reading is incremented by the value $2^{L+1}$ (where L=number of count bits) and the logical level of the comparison bit is set to the logical level of the overflow bit.

In a further advantageous development of the second method of the present invention the global counter reading is respectively acquired by a plurality of count bits in successive count cycles. In addition to the count bits, an overflow bit is maintained whose logical level is inverted with every beginning of a count cycle and a comparison bit is maintained for each of the virtual connection. The counter reading of the respective virtual connection is updated at least once per count cycle in that, given inequality of the logical level of the comparison bit allocated to the respective virtual connection and the overflow bit, the momentary counter reading is decremented by the value $2^{L+1}$ (where L is the number of count bits) and the logical level of the comparison bit is set to the logical level of the overflow bit.

In general terms the present invention is also a circuit arrangement for monitoring declared transmission bit rates in the transmission of message cells according to an asynchronous transfer mode during the course of virtual connections using a counter means individually allocated to the individual virtual connections a momentary counter reading is modified with every appearance of a message cell of the respective virtual connection that is referenced by a connection information contained in the respective message cell. A transgression of the declared transmission bit rate is indicated when the momentary counter reading reaches a predetermined minimum limit value. Control means are provided and fashioned such that a count value corresponding to relationship between the maximally permitted transmission bit rate and the transmission bit rate declared for the virtual connection and a minimum counter reading as a limit value are call-individually determined for the allocated counter means during the course of the setup of the respective virtual connection. The count value and the minimum counter reading are retained for the duration of the existence of the virtual connection. The momentary counter reading is also set to a fixed, initial counter reading. Global counter means are provided and fashioned such that the plurality of message cells appearing during the course of the established virtual connection is acquired by a global counter reading that is incremented by a value "1" with every appearance of a message cell. Means for the implementation of arithmetic operations are provided and fashioned such that a sum value is additionally individually formed for the respective virtual connection in response to the appearance of a message cell. The sum value is formed from the momentary counter reading and the current global counter reading. The sum value is compared to the predetermined minimum counter reading. Given a sum value that is greater than or equal to the minimum counter reading, the momentary counter reading is decremented by the count value retained for the respective virtual connection and is retained as the current momentary counter reading. Given a sum value that is less than the minimum counter reading, the momentary counter reading is retained and a transgression of the transmission bit rate declared for the respective virtual connection is indicated.

In an alternative embodiment of the present invention the transgression of the declared transmission bit rate is indicated when the momentary counter reading reaches a predetermined maximum limit value. Control means are provided and fashioned such that a count value corresponding to relationship between the maximally permitted transmission bit rate and the transmission bit rate declared for the virtual connection, and a maximum counter reading as limit value are call-individually determined for the allocated counter means during the course of the setup of the respective virtual connection. The count value and the maximum counter reading are retained for the duration of the existence of the virtual connection. The momentary counter reading is also set to a fixed, initial counter reading. Global counter means are provided and fashioned such that the plurality of message cells appearing during the course of established virtual connection is acquired by a global counter reading that is incremented by a value "1" with every appearance of a message cell. Means for the implementation of arithmetic operations are provided and fashioned such that a difference value is additionally individually formed for the respective virtual connection in response to the appearance of a message cell. The difference value is formed from the momentary counter reading and the current global counter reading. The difference value is compared to the predetermined maximum counter reading. Given a difference value that is less than or equal to the maximum counter reading, the momentary counter reading is incremented by the count value retained for the respective virtual connection and is retained as the current momentary counter reading. Given a difference value that is greater than the maximum counter reading, the momentary counter reading is retained and a transgression of the transmission bit rate declared for the respective virtual connection is indicated.

The present invention has the advantage that a call-associated count value on the basis of the allowable, maximum transmission bit rate and the transmission bit rate declared for the respective virtual connection as well as a call-associated limit value need be determined only during the course of the setup of the respective virtual connection. Upon arrival of a message cell during an existing connection, only simple addition or, respectively, subtraction operations and comparison operations need be implemented without identifying the arrival time of the respective message cell.

The advantage of the circuit arrangement of the present invention is the low circuit-oriented outlay for a call-associated monitoring of declared transmission bit rates.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 shows a block circuit diagram of a circuit arrangement embodying the present invention;

FIG. 2 shows one structure embodiment of the processing means that is only schematically shown in FIG. 1;

DESCRIPTION OF THE PREFERRED EMBODIMENTS

Figure 3:
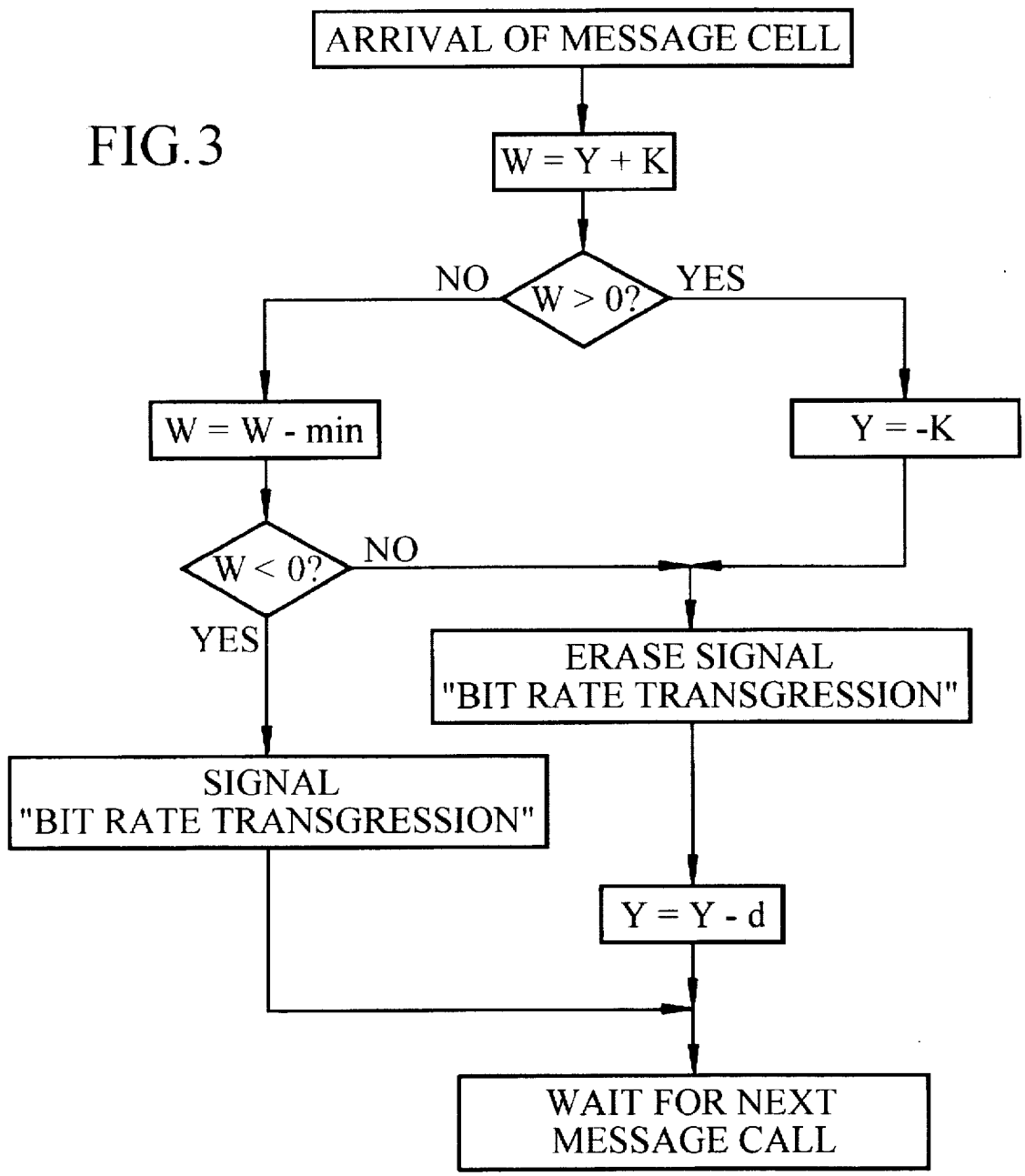
FIG. 3 shows a flowchart of a method according to a first exemplary embodiment of the present invention.

FIG. 1 schematically shows an ATM communication equipment BVA ATM-C, operating according to an asynchronous transfer mode, to which are connected a plurality of offering trunks E1 through En, as well as, a plurality of serving trunks A1 through An. A respective transmission of message cells according to an asynchronous transfer mode ensues on the offering trunks and serving trunks during the course of virtual connections. The message cells are thereby cells having a fixed length that respectively have a cell header with a virtual channel number indicating the respective virtual connection as well as an information part. The transmission of the actual message signals ensues in the information part. Data and text signals as well as voice or, respectively, image signals in digital form are to be understood as message signals.

As proceeds from FIG. 1, a respective handling means BHE is allocated to each of the offering trunks E1 through En. Such a handling means (whose structure shall be described in greater detail later) accepts the message cells transmitted over the allocated offering trunk during the course of virtual connections and implements a check of the adherence to the transmission bit rate determined for the respective virtual connection in call-associated fashion before forwarding these message cells to a switching network KA of the ATM communication equipment BVA. A multi-stage structure with a plurality of switching matrices KV connected to one another, moreover, is indicated in FIG. 1 only as an example of the switching network KA. Any desired one-stage or multi-stage switching networks, however, can also be used. Since the structure and functioning of such switching networks for forwarding message cells to serving trunks referenced A1 through An in FIG. 1 is known, this shall not be discussed in greater detail below.

FIG. 2 shows a possible structure of the aforementioned handling means BHE. Only those circuit parts that are required for an understanding of the present invention are thereby recited.

An interface means S is connected to the respective offering trunk (referenced E in FIG. 2). This interface means S, recognizes the start of serially transmitted message cells and, combines bits respectively appearing in message cells into bit groups with a respectively defined plurality of bits, for example 8 bits, and offers the individual bit groups (octets) in parallel form via a line system. This interface means S is followed by a register Reg1 as a delay means and by a decoder DEC. A message cells to be conducted to the afore-mentioned switching network KA pass through this register Reg1. The delay time is determined such that the circuit arrangement described below can implement a check of the adherence to the transmission bit rate determined for the respective virtual connection before forwarding a just accepted message cell to the switching network KA.

The cell header of a message cell accepted into the register Reg1 is additionally supplied to the decoder DEC that, by decoding the virtual channel number contained in this cell header, offers address signals that are supplied to a bit rate memory BSP via first inputs of a multiplexer M. The bit rate memory BSP has a separate memory area for each of the virtual connections possible on the appertaining offering trunk E. The individual memory areas can thereby be individually selected based on the criterion of the virtual channel numbers contained in message cells and decoded by the decoder DEC. When, for example, virtual connections, referenced "0" through "n-1", can proceed via the appertaining offering trunk, then memory areas referenced "0" through "n-1" are allocated to them, as indicated in FIG. 2. These memory areas are part of a counter means individually allocated to the respective virtual connection. The individual memory areas thereby serve, first, for storing a momentary counter reading (to be described below) of the respective counter means as well as, second, for storing parameters that are call-individually determined during the course of the setup of the respective connection (to be described below). This storing ensues under the control of a control means referenced ST in FIG. 2 that is connected, first, to data inputs of the bit rate memory BSP and, second, to second inputs of the multiplexer M via bus systems and that is also connected to the interface means S via a control line SL. The momentary counter readings and parameters stored for the virtual connections, are referenced Y,d and $W_{min}$ in FIG. 2.

In addition to an individual memory area of the bit rate memory BSP, a shared arithmetic unit AE available to the individual counter means in multiplex mode also belongs to all counter means allocated to an offering trunk. Via a line system, this arithmetic unit AE is in communication with data outputs of the bit rate memory BSP as well as with outputs of a global counter means GZ. The latter has a count input connected to the interface means S in order to globally acquire the plurality of message cells appearing via the offering trunk E during the existing virtual connection. At its output side, the arithmetic unit AE is in communication with the data inputs of the bit rate memory BSP as well as with the control means ST.

The structure of the handling means BHE shown in FIG. 2 having been set forth above, the functioning of such a handling means shall be described in greater detail, first with reference to the flowchart in FIG. 3.

As already mentioned, individually determined parameters are entered into the memory areas of the bit rate memory BSP allocated to the individual virtual connections. The determination is carried out by the control means ST during the course of the setup of the respective virtual connection, namely based on the criterion of a transmission bit rate indicated by the subscriber equipment (calling subscriber equipment) requesting the connection to be set up at the moment. These parameters are a count value d and a limit value for the counter reading that is selected as minimum counter reading $W_{min}$ in the present exemplary embodiment. The count value d thereby corresponds to the relationship of the transmission bit rate maximally permitted for the offering trunk E to the transmission bit rate declared for the respective virtual connection, in other words the count value d is selected proportional to this relationship. The count value d thus assumes a value W>1 given a plurality of virtual connections proceeding via the offering trunk E. After such a definition of the parameters, they are entered (for the full duration of the connection) into the memory area of the bit rate memory BSP coming into consideration for the respective virtual connection, being entered during the course of a write cycle proceeding from the control means ST by a corresponding addressing via the multiplexer M. Over and above this, a momentary counter reading Y is set to a predetermined initial value, for example to the value Y=0, during the course of this write cycle.

When a message cell appears on the offering trunk referenced E in FIG. 2, then this is supplied to the register Reg1 proceeding from the interface means S after an octet-by-octet conversion. The control means ST is also informed of the appearance of this message cell by a status signal transmitted via the afore-mentioned control line SL. Proceeding from the interface means S, the decoder DEC also accepts the cell header contained in the message cell that has just appeared. Finally, the global counter means GZ is supplied with a signal as count signal with which the momentary counter reading that covers the plurality of message cells supplied via the offering trunk E is incremented by the value "1".

In response to the appearance of the status signal, the control means ST controls a read cycle in the bit rate memory BSP according to the criterion of the address signals offered by the decoder DEC via the multiplexer M. As a result thereof, this bit rate memory offers the aforementioned particulars (parameters and momentary counter reading) stored in the memory area that was just addressed at its data outputs. Together with the momentary counter reading of the global counter means ZP, these particulars are accepted by the arithmetic unit AE.

The arithmetic unit AE then executes the following arithmetic operations shown in the FIG. 3 flowchart. First, a sum value W is formed from the call-associated, momentary counter reading Y and the global counter reading K of the global counter means GZ. This sum value W is subsequently compared to the minimum counter reading $W_{min}$. In the present exemplary embodiment, the minimum counter reading $W_{min}$ is subtracted from the sum value W. When this comparison shows that the sum value W is greater than or equal to the minimum counter reading $W_{min}$, then the momentary counter reading Y is decremented by the aforementioned count value d. Under the control of the control means ST, a write cycle in the bit rate memory BSP subsequently ensues. The decremented, momentary counter reading is thereby entered into the memory area addressed by the decoder DEC via the multiplexer, overwriting the momentary counter reading that had been previously stored therein.

When, by contrast, the afore-mentioned comparison shows that the sum value W is lower than the minimum counter reading $W_{min}$ (aggregate value assumes a value of less than zero), then the momentary counter reading Y is retained unaltered, and the control means ST is supplied with a status signal with which an upward transgression of the transmission bit rate declared for the respective virtual connection is indicated. In response to this control signal, for example, the message cell stored at the moment in the register Reg1 (FIG. 2) can be erased.

In the present exemplary embodiment, wherein the momentary counter reading Y always has negative values due to the decrementation by the count value d proceeding from an initial counter reading of Y=0, it is also provided that the momentary counter reading Y is set to the value Y=−K given a sum value of W=Y+K>0. W>0 always occurs whenever no message cell has arrived for the respective virtual connection over a longer time. Subsequently, the momentary counter reading Y is directly decremented by the count value d retained for the respective virtual connection, i.e. without an afore-mentioned comparison of the sum value to the minimum counter reading $W_{min}$. The momentary counter reading deriving therefrom is then written back into the bit rate memory BSP in the above-recited way.

The procedures that were just set forth and that are shown in the FIG. 3 flowchart repeat with every appearance of a message cell on the offering trunk E in FIG. 2.

Figure 4:
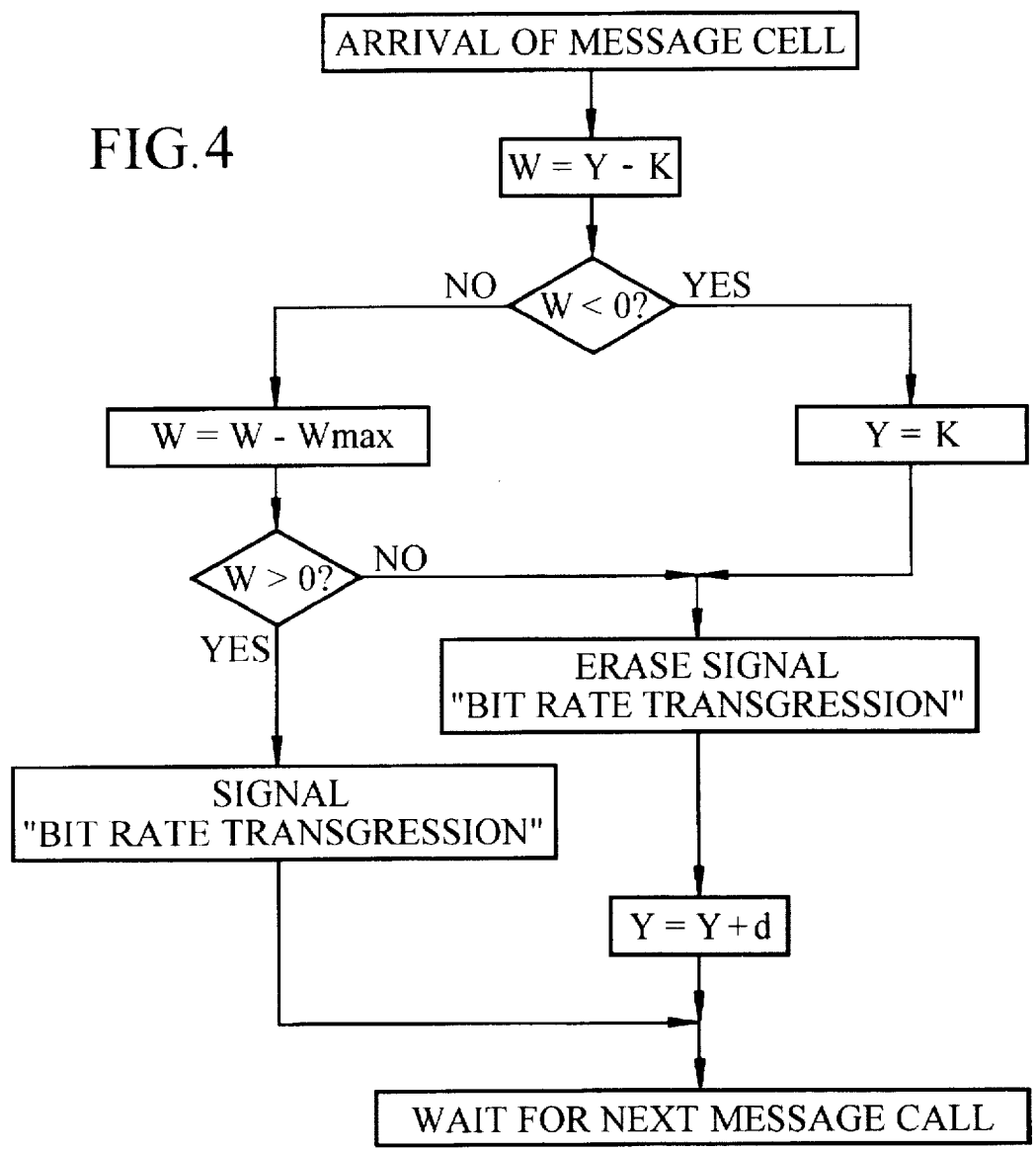
FIG. 4 shows a flowchart of a method according to a second exemplary embodiment of the present invention.

FIG. 4 shows a second exemplary embodiment of the method of the present invention. In this exemplary embodiment, a maximum counter reading $W_{max}$ is determined for the respective connection during the course of the call setup instead of a minimum counter reading $W_{min}$. Given the appearance of a message cell, the particulars stored for the appertaining virtual connection as well as the momentary counter reading K of the global counter means GZ are supplied to the arithmetic unit AE, as in the first exemplary embodiment. Subsequently, a difference value W is formed from the momentary counter reading Y and the current, global counter reading K. In the present exemplary embodiment, the global counter reading K is subtracted from the momentary counter reading Y. The difference value is subsequently compared to the maximum counter reading $W_{max}$ (maximum counter reading is subtracted from the difference value). Given a difference value that is less than or equal to the maximum counter reading, the momentary counter reading Y is incremented by the count value d determined for the respective virtual connection, and the current momentary counter reading resulting therefrom is written back into the bit rate memory BSP (FIG. 2) in the above-recited way.

When, by contrast, the result of the afore-mentioned comparison is that the difference value W is larger than the maximum counter reading $W_{max}$, then the momentary counter reading Y is retained, and a control signal for the display of the transgression of the transmission bit rate declared for the respective virtual connection is supplied to the control means ST in the above-recited way. In this second exemplary embodiment, wherein the momentary counter reading always has positive values due to the incrementation by the count value d proceeding from the initial counter reading Y=0, it is also provided that the momentary counter reading Y is set to the value Y=K given an afore-mentioned difference value of W=Y−K>0. This is always the case when no message cell has arrived for the respective virtual connection over a longer time. Subsequently, the momentary counter reading is directly incremented by the count value d retained for the respective virtual connection, i.e. without an afore-mentioned comparison of the difference value to the maximum counter reading $W_{max}$ and is then written back into the bit rate memory BSP in the above-recited way.

The above-recited procedure also repeats in this second exemplary embodiment with every appearance of a message cell on the offering trunk E shown in FIG. 2.

Figure 5:
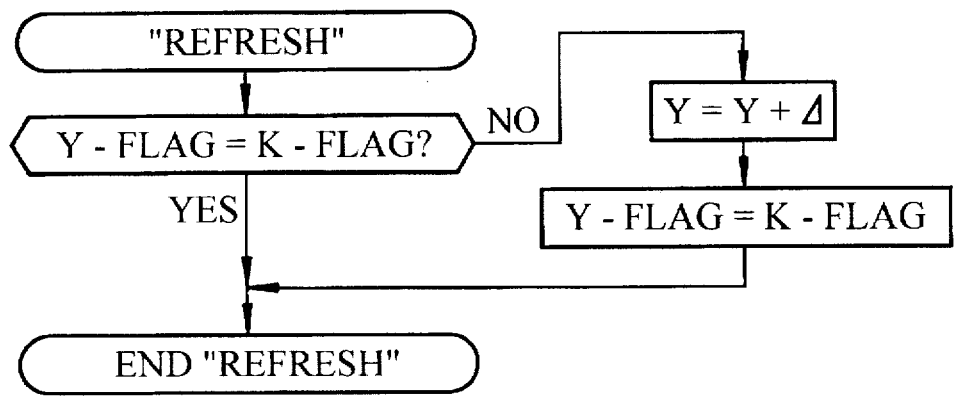
FIG. 5 shows a flowchart for a refresh procedure implemented in both exemplary embodiments.

The global counter means GZ is fashioned as a periodically cycling forward counter in both of the exemplary embodiments described above. This periodic cycling of the counter means is to be taken into account in the calculation of the momentary counter reading. The momentary counter reading for every virtual connection is to be updated within a count cycle of the global counter means. In order to acquire the overflow of the global counter means GZ, an additional overflow bit K-flag is provided that is inverted at the beginning of every count cycle. Over and above this, a bit Y-flag is provided in call-associated fashion in the bit rate memory BSP (FIG. 2), for example together with the call-associated particulars. The overflow bit K-flag is compared to the call-associated bit Y-flag in a "refresh" cycle shown in the FIG. 5 flowchart that precedes the methods explained on the basis of FIGS. 3 and 4. Only given inequality of these two bits, is the value of the momentary counter reading Y incremented by the value $\Delta=2^{L_K+1}$ in the method according to FIG. 3 and decremented by this value in the method according to FIG. 4, whereby $L_K$ indicates the plurality of count bits of the global counter means GZ. Also, the call-associated bit Y-flag is set to the logical level of the overflow bit K-flag. FIG. 5 only shows the "refresh" cycle in the method according to FIG. 3.

A "refresh" cycle as just set forth is implemented within a count cycle of the global counter means GZ for all existing virtual connections, even when no message cell arrived for the respective virtual connection within this count cycle.

In conclusion, let it also be pointed out that the above-recited processing means BHE shown in FIG. 2 represents only one possible embodiment of a circuit arrangement for realizing the methods of bit rate monitoring depicted in FIGS. 3 and 4. Circuit-oriented versions deviating therefrom, however, are also possible.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for monitoring predetermined transmission bit rates in transmission of message cells of a call according to an asynchronous transfer mode during virtual connections using counters individually allocated to respective virtual connections, comprising:

acquiring a plurality of message cells appearing during the course of established virtual connection by a global counter having a global counter reading that is incremented by a value "1" with every appearance of a message cell;

determining for a call, during setup of a respective virtual connection, a count value, corresponding to relationship between a maximum permitted transmission bit rate and the predetermined transmission bit rate for the respective virtual connection, and a minimum counter reading as a limit value for a respective counter;

retaining the count value and the minimum counter reading for a duration of the existence of the respective virtual connection;

setting a momentary counter reading to a fixed, initial counter reading;

forming a sum value for the respective virtual connection in response to the appearance of a message cell, the sum value being formed from the momentary counter reading and the current global counter reading;

comparing the sum value to the minimum counter reading;

decrementing, given a sum value that is greater than or equal to the minimum counter reading, the momentary counter reading by the count value retained for the respective virtual connection and retaining the decremented momentary counter reading as the current momentary counter reading; and retaining, given a sum value that is smaller than the minimum counter reading, the momentary counter reading and indicating a transgression of the predetermined transmission bit rate of the respective virtual connection.

2. The method according to claim 1, wherein, given a positive sum value, the momentary counter reading is set to a negative value of the global counter reading; and wherein the momentary counter reading resulting therefrom is decremented by the count value retained for the respective virtual connection, without a comparison of the sum value to the minimum counter reading, and is retained as the current momentary counter reading.

3. The method according to claim 1, wherein the method further comprises:

acquiring the global counter reading by a plurality of count bits in successive count cycles;

maintaining, in addition to the count bits, an overflow bit, whose logical level is inverted with every beginning of a count cycle, and a comparison bit for the respective virtual connection;

updating the counter reading of the respective virtual connection at least once per count cycle in that, given inequality of the logical level of the comparison bit allocated to the respective virtual connection and the overflow bit, the momentary counter reading is incremented by the value $2^{L+1}$ and the logical level of the comparison bit is set to the logical level of the overflow bit, where L is the number of count bits in the plurality of count bits.

4. A method for monitoring predetermined transmission bit rates in transmission of message cells of a call according to an asynchronous transfer mode during virtual connections using counters individually allocated to respective virtual connections, comprising:

acquiring a plurality of message cells appearing during the course of established virtual connection by a global counter having a global counter reading that is incremented by a value "1" with every appearance of a message cell;

determining for a call, during setup of a respective virtual connection a count value, corresponding to relationship between a maximum permitted transmission bit rate and the predetermined transmission bit rate for the respective virtual connection, and a maximum counter reading, as a limit value for the respective counter;

retaining the count value and the maximum counter reading for a duration of the existence of the respective virtual connection;

setting a momentary counter reading to a fixed, initial counter reading;

forming a difference value for the respective virtual connection in response to the appearance of a message cell, the difference value being formed from the momentary counter reading and the current global counter reading;

comparing the difference value to the maximum counter reading;

incrementing, given a difference value that is less than or equal to the maximum counter reading, the momentary counter reading by the count value retained for the respective virtual connection and retaining the incremented momentary counter reading as the current momentary counter reading; and retaining, given a difference value that is greater than the maximum counter reading, the momentary counter reading and indicating a transgression of the predetermined transmission bit rate of the respective virtual connection.

5. The method according to claim 4, wherein, for forming the difference value, the maximum counter reading is subtracted from the momentary counter reading;

wherein, given a negative difference value deriving therefrom, the momentary counter reading is set to a value of the global counter reading; and wherein the momentary counter reading resulting therefrom is incremented by the count value retained for the respective virtual connection, without a comparison of the difference value to the maximum counter reading, and is retained as current momentary counter reading.

6. The method according to claim 4, wherein the method further comprises:

acquiring the global counter reading by a plurality of count bits in successive count cycles;

maintaining, in addition to the count bits, an overflow bit, whose logical level is inverted with every beginning of a count cycle, and a comparison bit for the respective virtual connection;

updating the counter reading of the respective virtual connection at least once per count cycle in that, given inequality of the logical level of the comparison bit allocated to the respective virtual connection and the overflow bit, the momentary counter reading is incremented by the value $2^{L+1}$ and the logical level of the comparison bit is set to the logical level of the overflow bit, where L is the number of count bits in the plurality of count bits.

7. A circuit arrangement for monitoring predetermined transmission bit rates in transmission of message cells of a call according to an asynchronous transfer mode during virtual connections comprising:

counters individually allocated to respective virtual connections, a respective counter of said counters having a momentary counter reading that is modified with every appearance of a message cell of the respective virtual connection that is referenced by connection information contained in the respective message cell, a transgression of a predetermined transmission bit rate being indicated when the momentary counter reading reaches a predetermined minimum limit value;

a memory for storing at least a current counter reading of the counter, a minimum counter reading, and a count value for a duration of the existence of the virtual connection, the momentary counter reading also being set to a fixed, initial counter reading;

global counter means are provided and fashioned such that the plurality of message cells appearing during the course of established virtual connections is acquired by a global counter having a global counter reading that is incremented by a value "1" with every appearance of a message cell;

arithmetic unit for implementing arithmetic operations such that a sum value is additionally individually formed for the respective virtual connection in response to an appearance of a message cell, the sum value being formed from the momentary counter reading and the current global counter reading;

a comparator for comparing the sum value to the minimum counter reading;

wherein given a sum value that is greater than or equal to the minimum counter reading, the momentary counter reading is decremented by a count value for the respective virtual connection and is stored in the memory as the current momentary counter reading as the current momentary counter reading, and wherein given a sum value that is smaller than the minimum counter reading, the momentary counter reading is stored and a transgression of the transmission bit rate declared for the respective virtual connection is indicated.

8. A circuit arrangement for monitoring predetermined transmission bit rates in transmission of message cells of a call according to an asynchronous transfer mode during virtual connections comprising:

counters individually allocated to respective virtual connections, a respective counter of said counters having a momentary counter reading that is modified with every appearance of a message cell of the respective virtual connection that is referenced by connection information contained in the respective message cell, a transgression of a predetermined transmission bit rate being indicated when the momentary counter reading reaches a predetermined maximum limit value;

a memory for storing at least a current counter reading of the counter, a minimum counter reading, and a count value for a duration of the existence of the virtual connection, the momentary counter reading also being set to a fixed, initial counter reading;

global counter means are provided and fashioned such that the plurality of message cells appearing during the course of established virtual connections is acquired by a global counter having a global counter reading that is incremented by a value "1" with every appearance of a message cell;

arithmetic unit for implementing arithmetic operations such that a difference value is additionally individually formed for the respective virtual connection in response to an appearance of a message cell, the difference value being formed from the momentary counter reading and the current global counter reading;

a comparator for comparing the difference value to the minimum counter reading;

wherein given a difference value that is less than or equal to the maximum counter reading, the momentary counter reading is incremented by a count value for the respective virtual connection and is stored in the memory as the current momentary counter reading as the current momentary counter reading, and wherein given a difference value that is greater than the maximum counter reading, the momentary counter reading is stored and a transgression of the transmission bit rate declared for the respective virtual connection is indicated.

\* \* \* \* \*